United States Patent [19]

Sansom et al.

[11] Patent Number: 5,771,236
[45] Date of Patent: Jun. 23, 1998

[54] METHOD FOR INCREASING ISDN CHANNEL CAPACITY OF TDM SERIAL COMMUNICATION LINK FOR DIGITAL SUBSCRIBER LINE CHANNELS

[75] Inventors: Michael Scott Sansom; Robert James Toth, both of Huntsville, Ala.

[73] Assignee: ADTRAN, Inc., Huntsville, Ala.

[21] Appl. No.: 711,811

[22] Filed: Sep. 10, 1996

[51] Int. Cl.⁶ .............................. H04J 3/12; H04Q 11/04
[52] U.S. Cl. ........................ 370/458; 370/524; 370/535
[58] Field of Search ..................................... 370/360, 384, 370/458, 465, 474, 476, 477, 522, 524, 535, 904, 916

[56] References Cited

U.S. PATENT DOCUMENTS

| | | | |
|---|---|---|---|
| 4,799,217 | 1/1989 | Fang | 370/458 |
| 4,999,836 | 3/1991 | Fujiwara | 370/522 |
| 5,144,625 | 9/1992 | Cain et al. | 370/522 |
| 5,452,306 | 9/1995 | Turudic et al. | 370/524 |
| 5,682,385 | 10/1997 | Garcia et al. | 370/458 |

*Primary Examiner*—Alpus H. Hsu
*Attorney, Agent, or Firm*—Charles E. Wands

[57] ABSTRACT

An overhead bit-usurping multiplexing/demultiplexing mechanism increases the overall effective ISDN channel-conveying capacity of a serial digital data communication link, and thereby enables a terminal site channel bank to provide ISDN service to an additional number of customer premises equipments, other than the eight DSL channels normally accommodated within the twenty-four time slots of a (T1) TDM frame. Each condensed TDM DSL channel contains first and second multibit B information signal time slots, a multibit D information signal time slot, and a maintenance bit. No other auxiliary bits of a standard TR-NWT-000397 mode D+ octet are included, so that the compressed content TDM DSL channels have a smaller number of bits per channel than the standard TR-NWT-000397 format. As a result, when controllably interleaved with one another, the total number of TDM DSL channels (e.g., ten DSL channels) is larger than the eight DSL channels that would normally be accommodated within the twenty-four time slots of the TDM link.

12 Claims, 2 Drawing Sheets

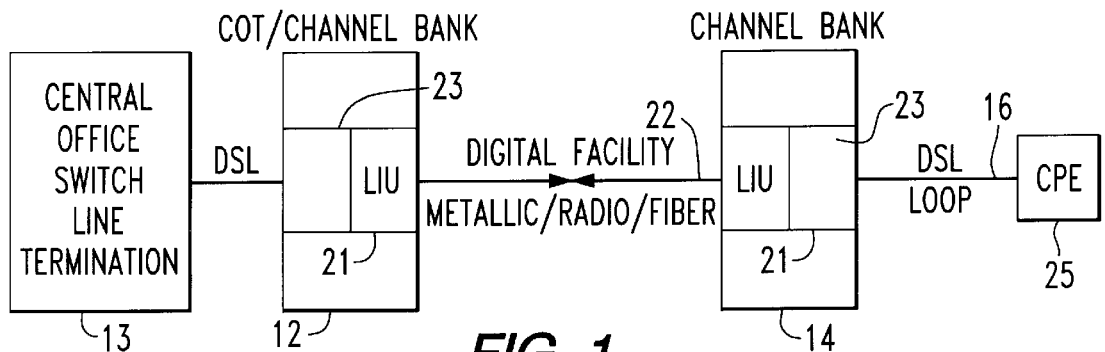
FIG. 1
*PRIOR ART*
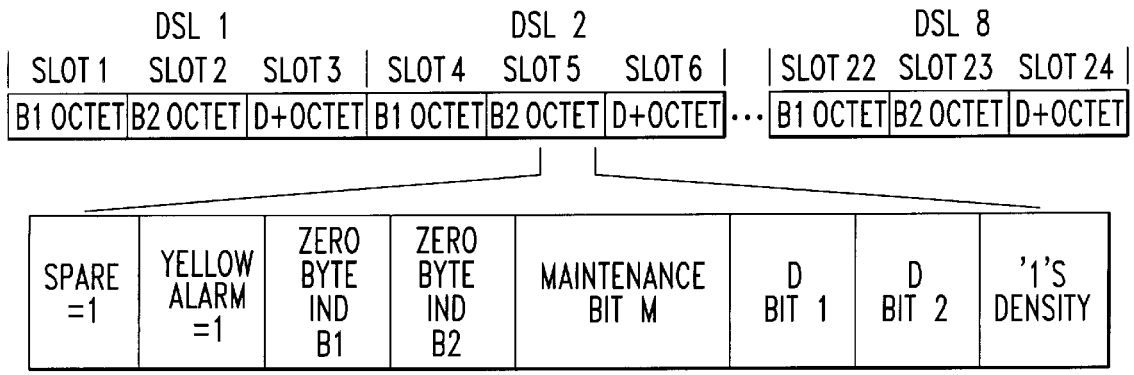
FIG. 2
*PRIOR ART*
| BIT NUMBER | DESCRIPTION |
|---|---|
| 1 | SPARE BIT (SET TO "1" WHEN NOT USED) |
| 2 | DS1 YELLOW ALARM BIT (SET TO "1" EXCEPT FOR ALARM) |
| 3 | ZERO BYTE INDICATOR FOR B1 TIME SLOT ("1" FOR B1=0) |
| 4 | ZERO BYTE INDICATOR FOR B2 TIME SLOT ("1" FOR B2=0) |
| 5 | MAINTENANCE (DSL OVERHEAD) CHANNEL BIT |
| 6 | D CHANNEL, 1ST BIT |
| 7 | D CHANNEL, 2ND BIT |
| 8 | 1'S DENSITY REQUIREMENT BIT (SET TO "1") |
FIG. 3
*PRIOR ART*

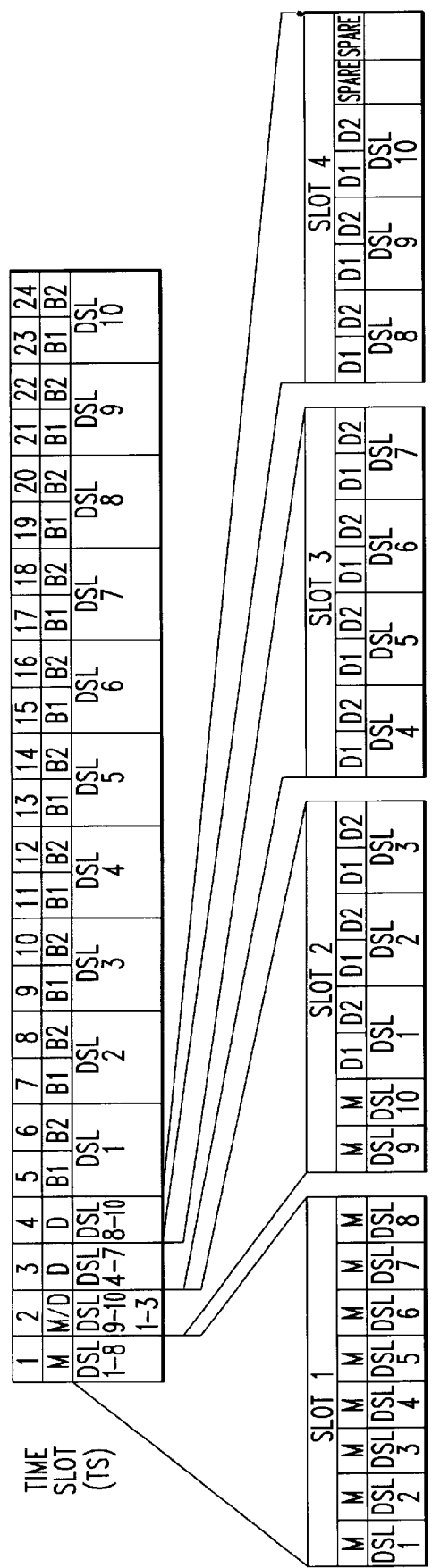
FIG. 5
FIG. 4
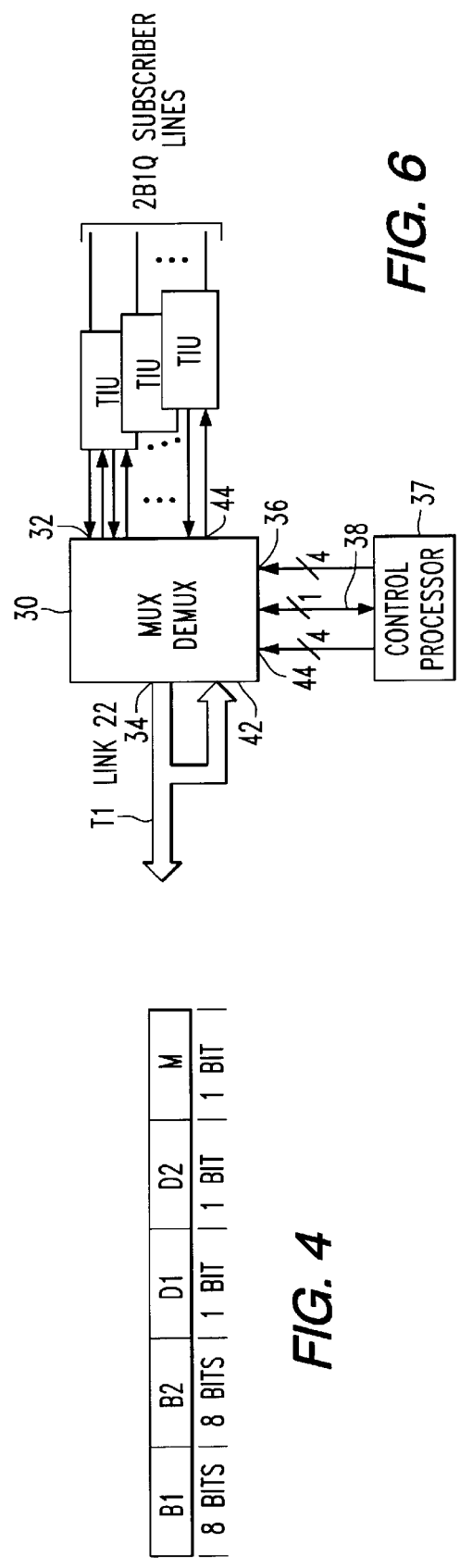
FIG. 6

METHOD FOR INCREASING ISDN CHANNEL CAPACITY OF TDM SERIAL COMMUNICATION LINK FOR DIGITAL SUBSCRIBER LINE CHANNELS

FIELD OF THE INVENTION

The present invention relates in general to communication systems, and is particularly directed to a mechanism for increasing the integrated services digital network (ISDN) channel-conveying capacity of a serial communication link, such as a T1 link, which is employed to transport a plurality of (e.g. ten) digital subscriber line (DSL) channels between geographically separated sites at which ISDN channel-interfacing channel banks are installed.

BACKGROUND OF THE INVENTION

The transmission of digital data signals over a time division multiplexed (TDM) serial communications link, such as a T1 telecommunications link that transports digitized telephone signals at a bit rate of 1.544 Mb/s, customarily involves the assembly of successive digital subscriber line (DSL) telephone channels into frames of multiple channels of digital data. For example, a typical DS1 frame transported over a T1 link contains twenty-four TDM telephone signalling channels, consisting of eight bits per channel (plus a framing bit for a total of 193 bits per frame).

As diagrammatically illustrated in FIG. 1, a T1 link termination site, such as a central office site 12, or a remote data terminal site 14 serving a plurality of DS0 digital subscriber loops 16, typically contains a line interface unit 21 terminating the TDM link 22 and a channel bank 23 (such as a D4 or SLC-96), which is coupled over the DSL loops 16 to the various customer premises equipments 25 being served by the terminal site.

For transporting basic rate (2B+D) ISDN channels, the multiplexing format of a respective one of each of the twenty-four DSL channels conveyed by the T1 link is diagrammatically illustrated in FIG. 2 as comprising a byte triplet, including a pair of bearer (B) time slot octets B1 and B2, and a data (D) time slot octet. For a standard TR-NWT-000397 mode formatted signalling scheme, the bit assignments for the data time slot octet (D+) are tabulated in FIG. 3. As shown therein, in addition to first and second D channel bits (7 and 8) and a maintenance (M) channel bit (6), the D+ octet includes a plurality of auxiliary bits (1–4 and 8), which allow the transport of an all zeroes bearer time slot across a link that would not otherwise support this data format, prevent false emulation of a yellow alarm condition, and provide for meeting '1's density requirements on some T1 carrier systems.

Now although the bit assignment scheme for a standard TR-NWT-000397 mode D+ octet shown in FIG. 3 provides for the transport of a variety of data formats through differing types of communication links, it does so at a price - decreased bandwidth efficiency, which reduces link usage efficiency. Where the link over which the data is transported is of the type that accommodates an all zeros code in a bearer octet time slot, most of the auxiliary bits of a standard D+ octet become superfluous.

SUMMARY OF THE INVENTION

The present invention takes advantage of such a link characteristic by using the superfluous information bits of each of the D+ octets of a standard TR-NWT-000397 mode TDM scheme to transport bearer and data information fields of an additional number of N (e.g. two) ISDN channels. What results is an increased number of 'condensed' digital subscriber line channels, that do not require altering the size or the number of time slots employed by the time division multiplexing scheme of the (T1) serial communication link. As a consequence, the overall effective ISDN channel-conveying capacity of the link can be increased, which enables a terminal site channel bank to provide ISDN service to a further number of customer premises equipments, in addition to the eight DSL channels normally accommodated within the twenty-four time slots of a TDM frame.

For this purpose, each condensed TDM DSL channel, to be transported by means of the selectively replaced portions of the D+ octets of the standard TR-NWT-000397 mode TDM scheme, comprises first and second multibit B information signal time slots, plus a multibit D information signal segment or sub-portion of a D octet time slot. Each D information signal segment carries signalling information for the bearer time slots B1 and B2. In addition, it can carry X.25 data packets. There are four time slots/channels of interest: B1, B2, D and M. A maintenance channel bit M is provided for each DSL channel. No other auxiliary bits of a standard TR-NWT-000397 mode D+ octet are included. Because these compressed content TDM DSL channels have a smaller number of bits per channel than the standard TR-NWT-000397 format, when controllably combined or interleaved with one another, the total number of TDM DSL channels is larger than would otherwise be accommodated within the twenty-four time slots of the TDM link.

Pursuant to an embodiment of the invention, the controlled interleaving involves assembling ten pairs of first and second bearer time slot octets (B1 and B2) into respective time slots (e.g., successive time slots TS5–TS24) associated with ten condensed DSL channels (e.g., channels DSL1–DSL10). These bearer time slots are appended to four successive time slots TS1–TS4 containing the maintenance (M) and signalling (D) channel octets.

The first time slot TS1 contains maintenance bits ($M_{DSL1}$–$M_{DSL8}$) associated with the first eight DSL channels DSL1–DSL8 2. The first two bit positions of the second time slot TS2 contain maintenance bits ($M_{DSL9}$–$M_{DSL10}$) associated with the remaining DSL channels DSL9–DSL10. The third through eighth bits of the second time slot TS2 contain three pairs of D bits, respectively corresponding to the first and second D bits (D1, D2) associated with the condensed channels DSL1–DSL3.

The third time slot TS3 contains four pairs of D bits, respectively corresponding to the (D1, D2) bits associated with the next four condensed channels (DSL4–DSL7). The first six bit positions of the fourth time slot TS4 contains three pairs of D bits, respectively corresponding to the (D1, D2) bits associated with the last three condensed channels (DSL8–DSL10). The remaining two bit positions of the fourth time slot TS4 are spares.

Modifying the format of each standard TR-397 mode DSL channel in the manner described above effectively condenses each original DSL channel from a length of twenty-four bits per channel to nineteen bits per channel. The five extra bits per channel yields a total of forty available bit positions within the twenty-four (eight bit) channels per frame, which is sufficient to accommodate the thirty-eight bits occupied by the two additional condensed DSL channels DSL 9 and DSL 10, thereby increasing the available frame capacity from eight DSL channels to ten DSL channels.

BRIEF DESCRIPTION OF THE DRAWINGS

FIG. 1 diagrammatically illustrates a communication network containing a TDM serial communication link terminated by respective sites serving a plurality of digital subscriber loops;

FIG. 2 diagrammatically illustrates the multiplexing format of the DSL channels of the T1 link of the communication network of FIG. 1 for transporting ISDN channels;

FIG. 3 tabulates the bit assignments of a D+ data time slot octet for a standard TR-NWT-000397 mode signalling scheme;

FIG. 4 illustrates the contents of a respective condensed format DSL channel employed in accordance with a 'modified' TR-NWT-000397 mode multiplexed scheme of the present invention;

FIG. 5 diagrammatically illustrates the manner in which the overall multiplexing format of T1 link of the communication network of FIG. 1 is modified in accordance with the present invention to provide condensed DSL channels for increasing ISDN channel transport capacity; and FIG. 6 diagrammatically illustrates a non-limiting example of a channel bank multiplexer/demultiplexer that may be employed to implement the multiplexing scheme of FIG. 5.

DETAILED DESCRIPTION

Before detailing the DSL channel format condensing mechanism of the present invention for increasing the integrated services digital network (ISDN) channel-conveying capacity of a serial communication link, it should be observed that the invention resides primarily in what is effectively a modified DSL channel multiplexing scheme and an augmentation of the control software employed by the micro-controller within the digital signalling and interface units employed in a respective channel bank, that enables a channel bank to provide service to an increased number of 'condensed' format ISDN channels, without increasing the number of time slots required for standard format signalling traffic over serial link between sites. The details of the circuitry of the channel bank components are otherwise essentially unaffected.

Consequently, the configuration of such channel banks and the manner in which they are interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

As pointed out briefly above, the DSL channel format condensing mechanism of the present invention is operative to increase the overall effective ISDN channel-conveying capacity of a serial TDM communication link, and thereby enable a channel bank to provide ISDN service to a larger number of customer premises equipments than would be the case using standard TR-NWT-000397 mode multiplexing format for the twenty-four time slots of a T1 TDM frame. For this purpose, as will be described below with reference to FIGS. 4 and 5, selected auxiliary information signals bits of a D+ octet, in particular the first through fourth and the eighth bits of a standard TR-NWT-000397 mode TDM scheme tabulated in FIG. 3, referenced above, are replaced by bits contained in bearer and data information fields of an additional pair of ISDN channels. The effect of this substitution is to increase the overall number of digital subscriber line channels per DS1 frame from eight to ten, without altering the size or the number of time slots employed by the time division multiplexing scheme of the serial communication link.

To this end, each TDM DSL channel to be transported over the available twenty-four time slots of the serial TDM link has a modified or 'condensed' format shown in FIG. 4, wherein the normal twenty-four bits per DSL channel are reduced to only nineteen bits per channel (comprised of sixteen bits for the bearer bytes B1 and b2, two data bits D1 and D2 and one maintenance bit M). This bit position occupancy reduction is achieved, as shown diagrammatically in the multiplexing format of FIG. 5, by usurping selected auxiliary bit locations of each D+ octet of the standard TR-NWT-000397 mode format.

More particularly, as illustrated in FIG. 4, a condensed DSL channel of the invention contains first and second multibit B information signal time slot octets (B1 and B2), plus multibit D information signal time slot octets (D1 and D2). The two bits of the D channel carries signalling information for channels B1 and B2. In addition, as noted previously, the D channel can carry X.25 data packets. Of the four channels of interest: B1, B2, D and M, the maintenance channel M is not logically grouped with the D channel. A maintenance channel bit M (which is formatted as per TR-NWT-000397) is provided for each DSL channel. No other auxiliary bits of the standard TR-NWT-000397 mode D+ octet of FIG. 3 are included in the condensed DSL channel format of FIG. 4.

The manner in which plural ones of the condensed TDM DSL channel of FIG. 4 are controllably combined or interleaved with one another to increase the channel conveying capacity of the TDM serial link is diagrammatically illustrated in FIG. 5. As noted earlier, changing the format of each standard TR-397 mode DSL channel in accordance with the present invention is operative to condense each DSL channel from a standard length of twenty-four bits per channel to a reduced length of only nineteen bits per channel. The five extra bits per channel made available by usurping bits 1–4 and 8 of the D+ octet of FIG. 3, providing a total of forty available bit positions within the twenty-four (eight bit) channels per frame, which is sufficient to accommodate the thirty-eight bits occupied by two additional condensed DSL channels, thereby increasing the available link capacity from eight DSL channels to ten DSL channels.

Referring now to FIG. 5, the modified multiplexing scheme of the invention is shown as assigning and transmitting the first and second bearer octets B1 and B2, respectively, to successive time slots (TS5–TS24) associated with ten condensed DSL channels DSL1–DSL10). These twenty bearer time slots are appended to four successive time slots TS1–TS4 containing the maintenance (M) and signalling (D) channel octets.

More particularly, the first time slot TS1 contains eight maintenance bits ($M_{DSL1}$–$M_{DSL8}$) associated with the first eight DSL channels DSL1–DSL8 2. The first two bit positions of the second time slot TS2 contain respective maintenance bits ($M_{DSL9}$–$M_{DSL10}$) associated with the remaining DSL channels DSL9–DSL10. The third through eighth bits of the second time slot TS2 contain three pairs of D bits, respectively corresponding to the first and second D bits (D1, D2) associated with condensed channels DSL1–DSL3.

The third time slot TS3 contains four pairs of (D1, D2) bits associated with the next four DSL channels DSL4–DSL7). The first six bit positions of the fourth time slot TS4 contains three pairs of D bits, respectively corresponding to the first and second D bits (D1, D2) associated with the last three condensed channels DSL8–DSL10. The remaining two bit positions of the fourth time slot TS4 are spares.

A non-limiting example of the actual hardware mechanism that may be employed to implement the multiplexing scheme of FIG. 5 for assembling a plurality of ISDN input channels from a plurality of subscriber loops onto a serial communication link is diagrammatically illustrated in FIG. 6 as comprising a multi-channel multiplexer/demultiplexer (MUX/DEMUX) unit 30. In the outbound (parallel-in, serial-out) direction, MUX/DEMUX unit 30 has a plurality (e.g., ten) input ports 32, a serial output port 34, and an associated (four bit) mux-select control port 36. For a twenty-four time slot T1 TDM serial link, input ports 32 are coupled to provide the pair of (64 Kb/s) bearer B octets B1 and B2 and (16 Kb/s) D bits per channel from transmission interface units (TIUs) 33, respectively ported to individual ones of the ISDN channels, such as 2B1Q subscriber lines. Serial output port 34 is coupled to the T1 link, while the four bit mux-select control port 36 is driven by the terminal site channel bank's transceiver micro-controller 37, which also injects a respective (8 Kb/s) maintenance M bit for each outbound channel vial link 38.

Conversely, for the inbound (serial-in, parallel-out) direction, MUX/DEMUX unit 30 has a serial input port 42, a plurality (e.g., ten) output ports 44, and an associated (four bit) demux-select control port 46. The serial input port 42 is coupled to the T1 link, while output ports 44 are coupled to provide the pair of (64 Kb/s) bearer B octets B1 and B2 and (16 Kb/s) D bits for application to the transmission interface units that are respectively ported to individual ones of the ISDN subscriber lines. The four bit demux-select control port 46 is driven by the micro-controller of the terminal site's channel bank transceiver, which also downloads the respective (8 Kb/s) maintenance M bits for each channel.

As will be appreciated from the foregoing description, the above-described shortcomings of a standard TR-NWT-000397 mode multiplexing format for the transport of DSL channels over a serial communication link, which is of the type that accommodates an all zeros code in a bearer octet time slot, are obviated in accordance with the present invention, which uses the superfluous information bits of each of the standard format D+ octets to transport bearer and data information fields of an additional number of N (e.g. two) ISDN channels. The improved multiplexing mechanism of the present invention results is an increased number of 'condensed' digital subscriber line channels, that do not require altering the size or the number of time slots employed by the time division multiplexing scheme of the (T1) serial communication link. As a consequence, the overall effective ISDN channel-conveying capacity of the link can be increased, which enables a terminal site channel bank to provide ISDN service to an additional number of customer premises equipments, other than the eight DSL channels normally accommodated within the twenty-four time slots of a TDM frame.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a digital communication network having a serial communication link over which a multiplicity J of basic time division multiplexed (TDM) digital subscriber line (DSL) channels are normally conveyed within a plurality P of time division multiplexed time slots, each basic TDM DSL channel having first and second multibit bearer (B) information signal time slots and a multibit data (D) information signal time slot, said multibit (D) information signal time slot containing signalling information for said bearer (B) information signal time slots, a maintenance channel bit provided for each DSL channel, and a plurality of auxiliary overhead bits, said serial communication link being coupled to a multiple channel bank that is interfaced with a multiplicity M of integrated services digital network (ISDN) channels, a method of controlling the time division multiplexing of TDM DSL channels conveyed by said serial communication link so as to increase the number of TDM DSL channels that may be conveyed thereby and interfaced via said channel bank for an increased number of J+N ISDN channels within said P time slots, comprising the steps of:

(a) providing an additional number N of TDM DSL channels, each additional TDM DSL channel containing first and second multibit B information signal time slots, and a multibit D channel information signal time slot containing signalling information bits for said first and second B information signal time slots, and a maintenance channel bit; and (b) combining first and second multibit B information signal time slots, D channel signalling information bits and the maintenance bits of said multiplicity J of basic TDM DSL channels with first and second multibit B information signal time slots, D channel signalling information bits and the maintenance channel bit of said additional number N of DSL channels into an increased number K of condensed TDM DSL channels, wherein K=J+N, that are contained within said plurality P of time division multiplexed time slots conveyed over said serial communication link.

2. A method according to claim 1, wherein step (b) comprises:

(b1) generating a plurality of multibit B information signal time slots, respectively associated with selected ones of said J basic TDM DSL channels and said N additional TDM DSL channels provided in step (a), (b2) generating a first number of multibit D channel information signal time slots, each of which contains multiple pairs of first and second D channel bits carrying signalling information for B information time slots contained within said J basic TDM DSL channels;

(b3) generating a second number of multibit D channel information signal and maintenance information signal time slots, which contain N pairs of first and second D channel bits carrying signalling information for B information signal time slots contained within said N additional TDM DSL channels provided in step (a), and maintenance channel bits associated with said J basic TDM DSL channels and said additional number of N TDM DSL channels provided in step (a); and (b4) combining said multibit B information signal time slots generated in step (b1), said first number of multibit D channel information signal time slots generated in step (b2), and said second number of multibit D channel information signal and maintenance information signal time slots generated in step (b3) into said plurality P of time division multiplexed time slots conveyed over said serial communication link.

3. For use with a digital communication network having a serial communication link, which normally conveys thereover a multiplicity J of basic time division multiplexed (TDM) digital subscriber line (DSL) channels, each basic TDM DSL channel containing first and second multibit bearer (B) information signal time slots and a multibit data (D) information signal time slot, said multibit D information time slot containing signalling information for said B information time slots, a maintenance channel bit and a plurality of auxiliary overhead bits, said serial communication link being coupled to a multiple channel bank, that is normally interfaced with a multiplicity M of integrated services digital network (ISDN) channels, a method of controlling the multiplexed transmission of TDM DSL channels over said serial communication link so as to increase the number of TDM DSL channels that may be conveyed by said serial communication link and thereby the number of ISDN channels that may be interfaced with said channel bank comprising the steps of:

(a) generating a plurality of a plurality of multibit B information signal time slots, associated with said J basic TDM DSL channels and an additional number N of TDM DSL channels;

(b) generating a first multibit D channel information signal time slot, which includes multiple pairs of first and second D bits containing signalling information for B information signal time slots contained within a first number of said condensed TDM DSL channels;

(c) generating a second multibit D channel information signal time slot, which includes multiple pairs of first and second D bits containing signalling information for B information signal time slots contained within a second number of said condensed TDM DSL channels;

(d) generating third and fourth multibit information signal time slots, which include N pairs of first and second D channel information bits containing signalling information for B information time slots within said N additional TDM DSL channels, and maintenance channel bits associated with said condensed TDM DSL channels; and (e) combining the contents of said B information signal time slots, said first and second D channel information signal time slots and said third and fourth multibit information signal time slots with one another to form said plurality of condensed TDM DSL channels, within a plurality K of time division multiplexed time slots.

4. A method according to claim 3, wherein step (e) comprises selectively interleaving said B information signal time slots, said first and second D channel information signal time slots and said third and fourth multibit information signal time slots with one another.

5. A method according to claim 3, wherein step (e) comprises selectively interleaving said third and fourth mutlibit information time slots with said D channel information signal time slots and appending thereto said B information signal time slots.

6. A method according to claim 5, wherein said third multibit information signal time slot contains N pairs of first and second D channel bits containing signalling information for B information time slots within said additional TDM DSL channels, and N maintenance channel bits.

7. A method according to claim 6, wherein said fourth multibit information signal time slot contains J maintenance channel bits.

8. For use with a digital communication network having a serial communication link, which normally conveys thereover a multiplicity J of basic time division multiplexed (TDM) digital subscriber line (DSL) channels, each basic TDM DSL channel having first and second multibit bearer (B) information signal time slots and a multibit data (D) information signal time slot, said D time slot containing signalling information for B information time slots, a maintenance bit and a plurality of auxiliary bits, said serial communication link being coupled to a channel bank, normally interfaced with a multiplicity M of integrated services digital network (ISDN) channels, a channel bank arrangement for multiplexing condensed TDM DSL channels over said serial communication link, so as to augment said multiplicity J of TDM DSL channels by an additional number of N TDM DSL channels, and thereby increase the total number of TDM DSL channels that may be conveyed by said serial communication link, and thus the number of ISDN channels that may be interfaced with said channel bank, said channel bank arrangement comprising a multiplexer having a plurality P of input ports respectively coupled to receive a plurality of P ISDN channels, where P=J+N, a respective one of said P condensed TDM DSL channels containing first and second multibit B information signal time slots, and a pair of D channel information bits, a serial output port coupled to said serial communication link, and a control port, and a controller coupled to said multiplexer for controlling the manner in which said plurality of P ISDN channels are multiplexed by said multiplexer onto said serial communication link in accordance with a prescribed multiplexing format that includes:

a first multibit D channel information signal time slot, which contains multiple pairs of first and second D bits, containing signalling information for B information signal time slots contained within a first number of said P condensed TDM DSL channels;

a second multibit D channel information signal time slot, which contains multiple pairs of first and second D bits, containing signalling information for B information signal time slots contained within a second number of said P condensed TDM DSL channels;

third and fourth multibit information signal time slots, which contain N pairs of first and second D channel bits containing signalling information for B information time slots within said N additional TDM DSL channels, and P maintenance bits associated with said P condensed TDM DSL channels; and wherein the contents of said B information signal time slots, said first and second D channel information signal time slots and said third and fourth multibit information signal time slots are combined with one another to form said plurality P of condensed TDM DSL channels, within a plurality K of time division multiplexed time slots.

9. A channel bank arrangement according to claim 8, wherein said B information signal time slots, said first and second D channel information signal time slots and said third and fourth multibit information signal time slots are selectively interleaved with one another.

10. A channel bank arrangement according to claim 8, wherein said B information signal time slots are appended to time slots containing said first and second D channel information signal time slots and said third and fourth multibit information signal time slots.

11. A channel bank arrangement according to claim 10, wherein said third multibit information signal time slot includes N pairs of first and second D channel bits containing signalling information for B information time slots within said N additional TDM DSL channels, and N maintenance bits.

12. A channel bank arrangement according to claim 11, wherein said fourth multibit information signal time slot contains M maintenance bits.

* * * * *